Figure 3:
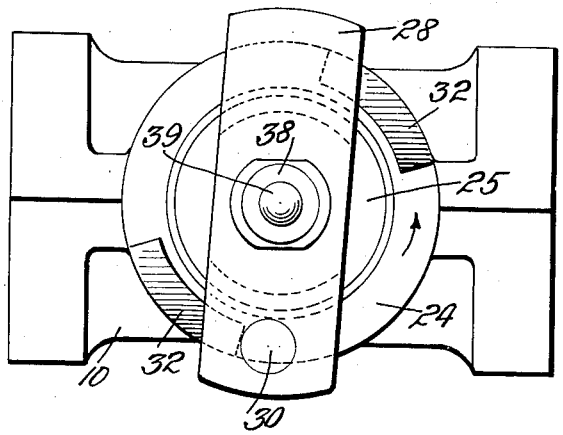

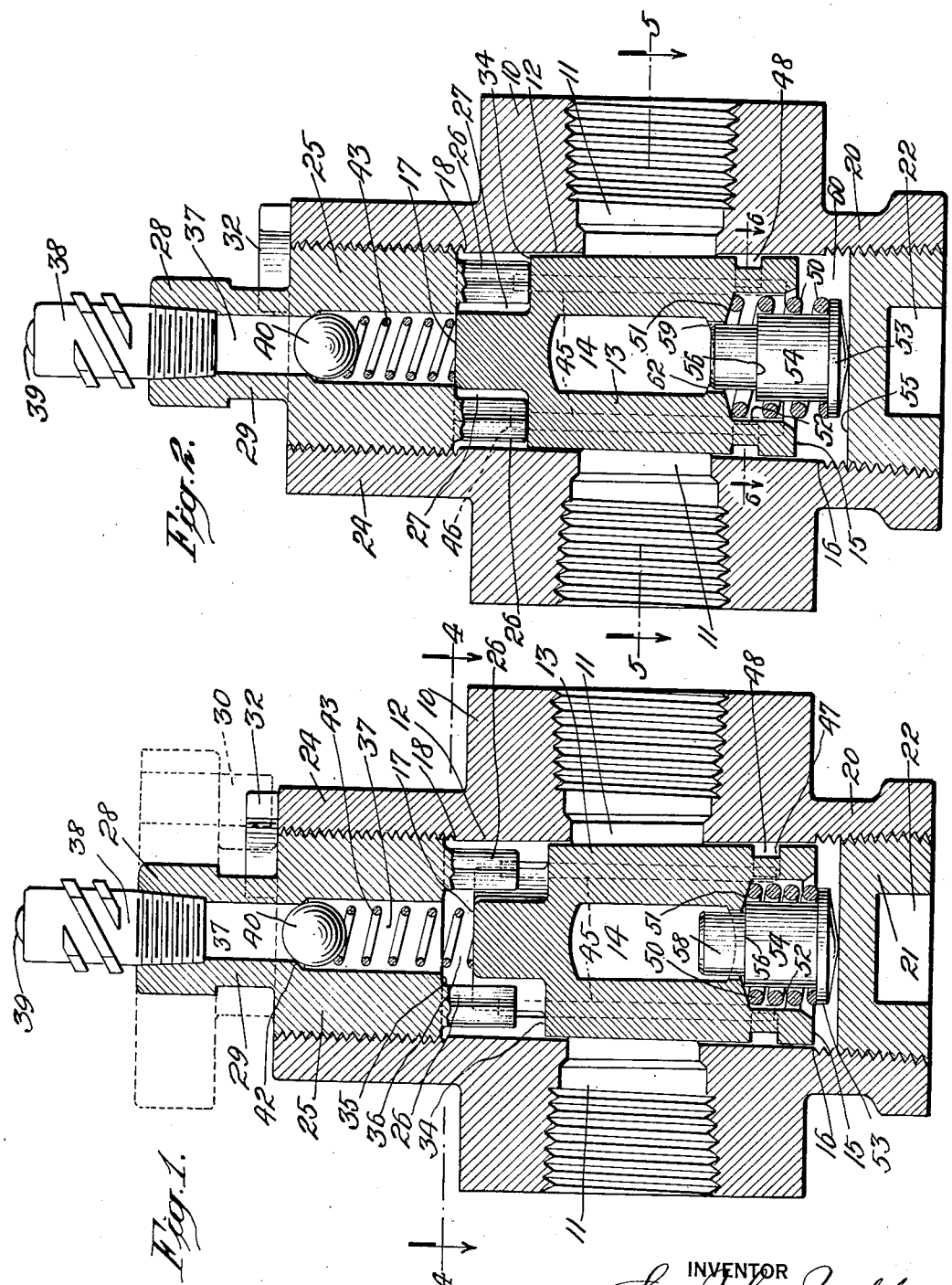

June 14, 1932.   S. J. NORDSTROM   1,863,380

VALVE

Filed May 22, 1929   2 Sheets-Sheet 2

INVENTOR
Sven Johan Nordstrom
BY Archibald Cox
ATTORNEY

Patented June 14, 1932

1,863,380

UNITED STATES PATENT OFFICE

SVEN JOHAN NORDSTROM, OF OAKLAND, CALIFORNIA, ASSIGNOR TO MERCO NORDSTROM VALVE COMPANY, OF SAN FRANCISCO, CALIFORNIA, A CORPORATION OF DELAWARE

VALVE

Application filed May 22, 1929. Serial No. 365,004.

The invention relates to an improvement in valves and more particularly to an improvement in tapered plug valves.

It has been proposed heretofore to substitute cylindrical plug valves for tapered plug valves in certain kinds of service, but previous to the application of pressure lubrication to plug valves such use was relatively restricted. Since the advent of pressure lubrication in plug valves, cylindrical plug valves have been rendered more serviceable and effective and their use has become correspondingly more extensive. One of the advantages of a cylindrical plug valve lies in the feature of construction by which the plug can be moved axially in both directions much greater distances than the plug in the usual type of tapered plug valves without interfering with the normal and effective functioning of the valve. This feature is taken advantage of to conduct a constant supply of lubricant under pressure to the peripheral surfaces of the plug and the coacting surfaces of the bore in the casing in which the plug is rotatably mounted. The lubrication of the coacting cylindrical surfaces of the plug and bore is effected by moving the plug axially against a supply or mass of lubricant to force the lubricant into channels formed in the coacting surfaces, whence the lubricant is distributed over the coacting surfaces. The means for moving the plug longitudinally may be either the fluid or line pressure in the valve, or a spring, or both.

But in spite of the application of pressure lubrication to cylindrical plug valves they still possess certain inherent defects which render them unsatisfactory for certain services. One of the disadvantages in the use of cylindrical plug valves lies in the fact that if the plug becomes stuck or frozen to the bore in the casing (which sometimes happens in most services and especially in corrosive service if the valve is not kept properly lubricated) it is difficult to free the plug. In tapered plug valves a struck or frozen plug can usually be readily freed either by lubricant under pressure or by striking the plug a sharp blow on its smaller end. As the tapered plug moves axially away from the tapered seat or bore in the casing the space between the plug and the seat becomes greater and hence the plug can be readily freed and the coacting peripheral surfaces of the plug and seat properly lubricated to restore the valve to normal use. In the cylindrical plug valve, on the other hand, moving the plug axially of the bore does not increase the space between the plug and the bore and hence the corroded part, either on the plug or in the bore, can not be moved free of the adjacent and opposite part for proper lubrication.

The object of the present invention is to produce an improved tapered plug valve combining the advantages of a cylindrical plug valve with the advantages of a tapered plug valve. To this end one of the features of the invention is to so construct and arrange the valve, (1) that the plug may have an axial movement in both directions in the bore substantially as great as the axial movement of a cylindrical plug without losing effectiveness in controlling the fluid passageway through the casing, and (2) that the feature inherent in a tapered plug valve of ready separation of the coacting valve surfaces when struck or frozen by movement of the plug in a direction to increase the space between the plug and the tapered seat or bore in the casing may be retained. Other objects of the invention and features of advantage will be pointed out as the description proceeds, the invention being fully described hereinafter and particularly pointed out in the appended claims.

Figure 4:
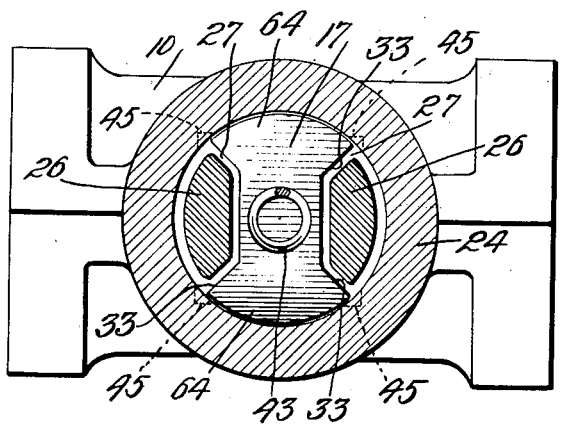
Figure 5:
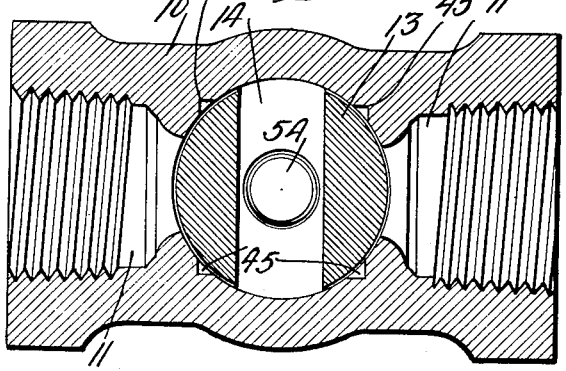
Figure 6:
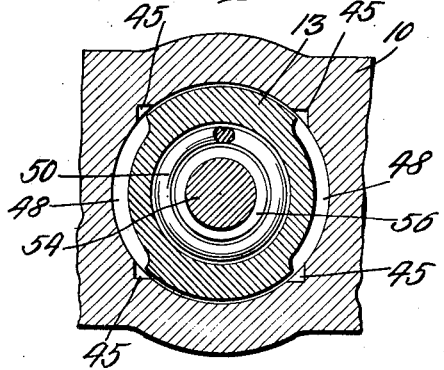

The preferred form of the invention is illustrated in the accompanying drawings in which Fig. 1 is a longitudinal section through the improved valve, with the tapered plug shown in its position of greatest separation from the tapered seat or bore in the casing; Fig. 2 is a view similar to Fig. 1, but with the tapered plug in its position of nearest approach to the tapered seat or bore in the casing; Fig. 3 is a top plan of the valve parts shown in Fig. 1; Fig. 4 is a horizontal section taken on the line 4—4 of Fig. 1; Fig. 5 is a horizontal section taken on the line 5—5 of Fig. 2; and Fig. 6 is a transverse section through the larger end of the plug, the section being taken on the line 6—6 of Fig. 2.

The improved valve as illustrated in the drawings comprises a casing 10 having a fluid passageway 11 extending therethrough and a tapered bore or valve seat 12 formed transversely of the passageway. Rotatably positioned in the bore 12 is a tapered plug 13 for controlling the passageway. The plug 13 is provided with a hole 14 which registers with the passageway 11 when the valve is open and which is out of registry with the passageway when the plug is turned to closed position, as shown in Figs. 1, 2 and 5. The adjacent peripheral surfaces of the plug 13 and the bore 12, known as the coacting valve surfaces, cooperate to control the fluid flow through the passageway. The tapered plug 13 is substantially shorter than the tapered bore 12 and the plug is arranged so that it may be moved axially in both directions in the bore 12. In Fig. 1 the plug 13 is shown in the position of greatest separation from the tapered bore or seat 12 and in this position the extremity 15 of the larger end of the plug is substantially coincident with the point 16 of the bore which may be regarded as the termination of the larger end of the bore. In Fig. 2 the tapered plug 13 is shown in the position in which its peripheral surfaces most nearly approach the coacting surfaces of the tapered bore 12, and in this position the extremity 17 of the smaller end of the plug is substantially coincident with the point 18 which may be regarded as the termination of the smaller end of the bore.

While the valve is in operation, the plug may occupy either the position shown in Fig. 1, the position shown in Fig. 2 or any intermediate position between these two extreme positions, depending upon conditions as hereinafter set forth. Whatever the axial position of the plug 13 with respect to the bore 12, whether closely approaching the bore as in Fig. 2, or most widely separated from the bore as in Fig. 1, the coacting tapered surfaces of the plug and the bore effectively control the fluid flow through the passageway 11 because the space between the coacting valve surfaces of the plug and the bore is filled with lubricant under pressure in the manner presently to be described. The lubricant employed for this purpose may be any one of the usual lubricants sold on the market for use in pressure lubricated valves, having regard to the particular kind of service for which the valve is intended. Such lubricants are usually in stick or cartridge form and they differ somewhat in consistency or viscosity depending upon the service in which they are to be used. Any of these lubricants when forced between the coacting valve surfaces of the plug and the bore provide an effective fluid tight seal between them. The taper of the plug 13 and of the bore 12 will be such (having regard to the amount of axial movement of the plug in the bore) that when the plug is in its position of greatest separation from the bore the space between the plug and the bore will not be greater than can be effectively filled and sealed by lubricant of usual viscosity. When the plug is in its position of nearest approach to the bore the plug will be held separated from the bore by a space sufficient to permit of the introduction of lubricant between the plug and the bore. In practice it has been found that when the plug is in its position of nearest approach to the bore the plug should be separated from the bore by a space of at lease one-half of one thousandth of an inch, and that when the plug is in its position of greatest separation from the bore the space between the plug and the bore should be less than two one thousandths of an inch for each one sixteenth of an inch the plug has traveled axially in moving to this end of the bore from its extreme position at the other end of the bore. Stops are provided to limit the axial movements of the plug in both directions.

Although the improved valve, in common with other tapered plug valves, may be used in any position relatively to the mounting of the plug 13 in the casing, the valve has been shown in the position illustrated in Figs. 1 and 2 for convenience of description only. It will be understood, therefore, that terms of position and direction herein refer only to the position of the valve as shown in the drawings. The tapered bore 12 constitutes the middle section of a bore extending through the casing 10 transversely of the fluid passageway 11. The lower end of this bore terminates in the internally threaded annular flange 20 extending outwardly from the lower side of the casing. A closure in the form of a pipe plug 21 is screwed into the flange 20 and is provided with a central recess 22 for the reception of the tool by which it is manipulated. The upper end of the transverse bore through the casing terminates in an enlongated annular projection 24 extending upwardly from the top side of the casing. The projection 24 is provided with an internal right hand thread to receive a threaded rotatable head 25. The inner or lower end of the head 25 has a loose driving connection with the upper or smaller end of the plug 13 to turn the plug to open and closed positions. For this purpose the inner end of the head 25 is provided with two lugs 26, which are truncated segments in cross-section, as is clearly seen in Fig. 4. The lugs 26 are loosely received in correspondingly shaped recesses 27 formed in the extremity of the smaller end of the plug 13. The lugs 26 are substantially as long as the recesses 27 are deep. The outer end of the head 25 is formed as a T-shaped member, the cross-piece 28 of which is connected with the body portion of the head 25 by the contracted neck-like part 29. The cross-piece 28 is adapted to receive a wrench by which the head 25 is rotated to turn the plug 13. In order to restrict the turning of the plug to an arc of substantially 90° only, the cross-piece 28 carries an inwardly projecting pin 30 which is adapted to travel between the stops 32 extending outwardly from the annular projection 24. To compensate for the back-lash between the lugs 26 and the adjacent coperating edges 33 in the smaller end of the plug forming the ends of the recesses 27, the stops 32 are spaced apart so that the cross-piece 28 will turn beyond its 90° position in each direction of travel, as indicated in Fig. 3, thereby assuring to the plug 13 a full 90° turn in each direction.

The plug 13 is prevented from fully seating in the bore 12 by the contact between the lower or inner ends of lugs 26 and the bottom surfaces 34 of the recesses 27 and by the contact between the extremity 17 of the smaller end of the plug with the inner end 35 of the head 25. The lugs 26 are so positioned relatively to the size and taper of the bore 12 that when the transverse surfaces at the inner or smaller end of the plug contact with the transverse surfaces at the inner end of the head 25 the plug is held separated from the bore by the predetermined minimum amount, and the plug is thereby prevented from wedging or jamming in the bore.

The means for conducting a supply of lubricant under pressure into the space between the peripheral surfaces of the plug and the bore comprises a lubricant containing chamber formed by the space between the inner end of the head 25 and the smaller end of the plug 13, this space being indicated generally at 36 in Fig. 1. The space or chamber 36 is in communication with the inner end of a bore 37 formed axially in the head 25 and adapted to receive lubricant introduced into the valve through a fitting 38 threaded into the outer end of the bore 37. The fitting 38 may be of well-known construction adapted for connection with a pressure grease gun. The outer end of the fitting is closed by a check valve 39 to prevent back flow of the lubricant. The bore 37 is also provided with a check valve 40 held against its seat 42 in the bore by means of a spring 43, the lower end of which bears against the middle point of the extremity 17 of the smaller end of the plug. It will be understood that the fitting 38 may be attached to the casing at any convenient point at which it is suitable to introduce lubricant under pressure into the valve.

In order to conduct the lubricant more readily to the coacting valve surfaces of the plug 13 and the bore 12 and fill the space between these surfaces, the bore is provided with four longitudinally arranged channels 45 spaced substantially 90° apart. The upper ends 46 of the channels extend upwardly beyond the bottom surfaces 34 of the recesses 27 in the smaller end of the plug when the plug is at the limit of its upward or inward travel, as indicated in Fig. 2, so that lubricant may pass freely from the lubricant chamber into the channels in this position of the plug. The lower ends of the channels 45 terminate at a point which is substantially coincident with the lower edges 47 of two oppositely disposed arcuate grooves 48, formed in the larger end of the plug, when the plug is at the limit of its downward or outward movement, as indicated in Fig. 1. When lubricant is introduced into the valve under pressure through the fitting 38, the lubricant filling the chamber 36 acts on the smaller end of the plug and moves it axially in a direction to separate the plug from the bore 12.

When the spaces in the valve adapted to receive lubricant have been filled and the pressure gun removed from the fitting 38, a constant supply of lubricant is automatically conducted to the peripheral surfaces of the plug and the bore through the channels 45 by moving the plug axially against the lubricant in the chamber 36 by means of a spring 50 interposed between the inner end 51 of a bore 52 formed axially in the larger end of the plug 13 and the inner surface of the laterally projecting edge of the head 53 of a pivot pin 54. The spring 50 is of stronger tension than the spring 43 and consequently is able to move the plug 13 axially against the action of the spring 43. The filling of the chamber 36 by lubricant under pressure causes the plug 13 to act against and compress the spring 50 to the condition shown in Fig. 1. As the lubricant becomes dissipated during the operation of the valve, the spring 50 expands and constantly urges the smaller end of the plug against the lubricant in the chamber 36, forcing it into channels 45 and thence into the space between the plug and the bore.

The head 53 of the pivot pin 54 is conically shaped on its outer surface to provide an anti-friction bearing for contact with the inner surface 55 of the closure 21. The edge or shoulder 56 of the body portion of the pivot pin 54 by contacting with the bottom surface 51 of the bore 52 acts as a stop to limit the axial downward or separating movement of the plug. The pin 54 is so positioned relatively to the size and taper of the bore that it prevents the plug from separating from the bore more than the predetermined maximum distance.

The inner end 58 of the pivot pin projects through a hole 59 which puts the bore 52 into communication with the hole 14 through the plug. The clearance between the end 58 of the pivot pin and the sides of the hole 59 is slight in order to prevent sediment from passing into the space 60 between the larger end of the plug and the inner surface 55 of the closure 21, but is large enough to permit lubricant which may have passed into the space 60 to escape into the hole 14. By reference to Fig. 2 it will be seen that when the plug is at the limit of its upward or inward movement the extremity of the inner end 58 of the pivot pin is substantially flush with the bottom 62 of the hole 14 through the plug, and that by reference to Fig. 1 it will be seen that when the plug is at the limit of its downward or outward movement, the inner end 58 of the pivot pin projects into the hole 14 a distance equal to the amount of axial movement of the plug. To compensate for this projection of the pin into the hole 14 the hole 14 has been enlarged so as not to restrict the passageway through the valve.

The lubricating system is so arranged that all the grooves 45 are supplied with lubricant under pressure only when the plug is in substantially full open and closed positions, and that in any other position of the plug two of the grooves, those exposed to the fluid pressure of the line in the valve, are cut off from the supply of lubricant under pressure. For this purpose the extremity 17 of the smaller end of the plug is left as two arcuate portions 64 substantially 90° in length between the edges 33 of the recesses 27. The arcuate grooves 48 are each substantially 90° in length and are so positioned that they are supplied with lubricant under pressure by all four grooves 45 when the plug is in its closed and open positions, and are supplied with lubricant under pressure by only two oppositely disposed grooves 45 in any other position of the plug.

The operation of the improved valve has been partially indicated during the description of the specific construction of the present embodiment. In the following résumé of the mode of operation the advantages flowing from the improvements in construction and operation will be more fully pointed out. Assuming that the valve parts have been assembled but no lubricant introduced into the valve, the plug 13 will be forced to the limit of its inward or seat approaching movement under the action of spring 50. The stops constituted by the lugs 26 and inner face 35 of the head 25 will prevent a metal to metal contact between the plug and the bore by holding the plug away from the bore the predetermined minimum amount. The pressure grease or lubricant gun having been attached to the fitting 38, lubricant is introduced into the valve until the chamber 36, the grooves 45 and 48, and the space between the tapered surfaces of the plug and the bore are completely filled with lubricant. The filling of the space between tapered surfaces of the plug and the bore is facilitated by turning the plug. As the lubricant enters the chamber 36 and passes into the grooves 45 it acts on the smaller end of the plug, moving the plug axially outwardly away from the seat or bore 12 and compressing the spring 50. When all the spaces adapted to contain lubricant have become filled, the plug has the position of greatest separation from the bore 12, as shown in Fig. 1. The valve is now in condition for use.

If the valve is kept properly lubricated and is employed in a non-corrosive service, the plug will have no tendency to stick to the bore 12 because of the film of lubricant interposed between the tapered surfaces of the plug and the bore. If now the plug has not been kept properly lubricated, or if it has been used in corrosive service which has destroyed the efficacy of the lubricant, and the plug has been forced by the spring 50 to its position of closest approach to the bore and has become stuck or fast to the bore, the introduction of a fresh supply of lubricant under pressure into the valve through the fitting 38 will result in freeing the plug. It is to be kept in mind that the sticking of the plug will not occur from a metal to metal contact between the plug and the bore because the plug is positively prevented from seating in the bore. The sticking occurs because the film of lubricant between the tapered surfaces of the plug and the bore has been replaced by a layer or film of sediment, rust or other foreign substance which becomes in effect a valve seat known as a secondary seat. The coacting valve surfaces of the present valve being tapered, the freeing of the plug is readily effected because the freeing movement imparted to the plug tends to pull apart or separate the corroded or stuck portions. In this connection it is important to observe that substantially this same separating effect can be secured by a tapered plug coacting with a substantially cylindrical bore. The secondary valve seat of sediment or rust forming between a tapered plug and a cylindrical bore will be an inverted hollow cone. As the plug is moved axially of this inverted hollow cone, the tapered outer surface of the plug will progressively separate from the inner tapered surface of the cone forming the secondary seat, although the axial movement of the plug will not alter its relation to the cylindrical bore.

The extent of axial movement of the plug should be sufficient to provide automatic lubrication of the valve over considerable periods of time. A minimum travel of one sixteenth of an inch has given satisfactory results, but for the usual run of services the axial movement should be upward from one sixteenth of an inch, depending on the size of the valve, for the most satisfactory results. It will be observed that this amount of axial movement of the plug is much greater than the axial movement of the tapered plugs of pressure lubricated valves heretofore produced. Whatever the amount of axial movement it is necessary in all cases that it be sufficient to permit the spring pressed plug to act on the lubricant in the lubricant chamber, forcing lubricant into the space between the tapered surfaces of the plug and the bore during the whole interval between one charging of the valve with lubricant and the next.

Having thus described the invention what I claim as new is:—

1. A valve comprising, a casing having a fluid passageway therethrough and a tapered bore transverse of the passageway, a tapered plug rotatably positioned in the bore and arranged to move axially therein a minimum of one sixteenth of an inch and to be effective to control the flow of fluid through the casing irrespective of its axial position in the bore, a stop at the larger end of the bore for positively preventing the plug from separating from the bore more than a predetermined distance, the taper of the plug and the bore being such that for each one sixteenth of an inch axial movement of the plug the radial clearance between the plug and the bore varies by less than two one thousandths of an inch, means for forcing lubricant against the plug to move the plug in one direction, means for moving the plug in the opposite direction and to fill the space between the plug and the bore with lubricant so that there is no leakage between the plug and the bore whereby the plug is effective in controlling the flow of fluid irrespective of its axial position, and means for turning the plug.

2. A valve comprising, a casing having a passageway therethrough and a tapered bore transverse of the passageway, a tapered plug rotatably positioned in the bore and arranged so that it may move axially in both directions therein, said plug being effective to control the flow of fluid through the casing irrespective of its axial position in the bore, a stop at the smaller end of the bore to prevent the plug from fully seating in the bore, a stop at the larger end of the bore to prevent the plug from separating from the bore more than a predetermined distance, said stops being spaced apart to permit the plug to move axially in either direction from one stop to the other at least one sixteenth of an inch, means for forcing lubricant against the plug to move it axially in a direction to separate it from the bore and to fill the space between the plug and the bore with lubricant so that there is no leakage between the plug and the bore whereby the plug is effective in controlling the flow of fluid irrespective of its axial position, means for moving the plug axially in the opposite direction, and means for turning the plug.

3. A valve comprising, a casing having a fluid passageway therethrough and a bore transverse of the passageway, a tapered plug rotatably positioned in the bore and arranged so that it may move axially in both directions therein, said plug being effective to control the flow of fluid through the casing irrespective of its axial position in the bore, a stop at each end of the bore to limit the axial movement of the plug, said stops being spaced apart to permit the plug to have an axial movement from one stop to the other of at least one sixteenth of an inch, the stop at the smaller end of the bore being positioned to prevent the plug from fully seating in the bore, means for forcing lubricant under pressure against the plug to move it axially in one direction and to fill the space between the plug and the bore with lubricant so that there is no leakage between the plug and the bore whereby the plug is effective in controlling the flow of fluid irrespective of its axial position, means for acting on the plug to move it in the opposite direction, and means for turning the plug.

4. A valve comprising, a casing having a fluid passageway therethrough and a tapered bore transverse of the passageway, a tapered plug rotatably positioned in the bore and arranged so that it may move axially in both directions therein, said plug being effective to control the flow of fluid through the casing irrespective of its axial position in the bore, a stop at each end of the bore to limit the axial movement of the plug, said stops being spaced apart to permit the plug to move axially in either direction from one stop to the other at least one sixteenth of an inch, the taper of the plug and the bore being such with respect to the amount of axial movement permitted to the plug that when the plug is at the limit of its axial movement in one direction it is separated from the bore by substantially one-half of one thousandth of an inch and when it is at the limit of its axial movement in the other direction it is separated from the bore by not more than substantially two one thousandths of an inch for each one sixteenth of an inch the plug moves axially, means for forcing lubricant against the smaller end of the plug to separate it from the bore and to fill the space between the plug and the bore with lubricant, means acting on the other end of the plug to move the plug in the opposite direction, and means for turning the plug.

5. A valve comprising, a casing having a passageway therethrough and a tapered bore transverse of the passageway, a tapered plug rotatably positioned in the bore and arranged so that it may move axially in both directions therein, said plug being effective to control the flow of fluid through the casing irrespective of its axial position in the bore, a stop at the smaller end of the bore to prevent the plug from fully seating in the bore, a stop at the larger end of the bore spaced from the first stop to permit the plug to move axially at least one sixteenth of an inch, the tapers of the plug and the bore being such with relation to the amount of axial movement of the plug that when the plug is in contact with the second stop the space separating the tapered surface of the plug from the bore is less than two one thousandths of an inch for each one sixteenth of an inch the plug has moved axially from the first stop, means for forcing lubricant against the smaller end of the plug to move it axially and to fill the space between the plug and the bore with lubricant, means for acting on the plug to move it in the direction of the smaller end of the plug, and means for turning the plug.

6. A valve comprising, a casing having a fluid passageway therethrough and a tapered bore transverse of the passageway, a tapered plug rotatably positioned in the bore and arranged to move axially therein a minimum of one sixteenth of an inch and to be effective to control the flow of fluid through the casing irrespective of its axial position of the plug, a stop at each end of the bore to limit the axial travel of the plug, the taper of the plug and the bore being such that for a one sixteenth of an inch axial movement of the plug the space between the tapered surface of the plug and the bore varies by less than two one thousandths of an inch, a chamber for containing lubricant exposed at one side to the smaller end of the plug, means for introducing lubricant under pressure into the chamber to act on the smaller end of the plug to move the plug axially in the direction to separate the plug from the bore and to fill the space between the plug and the bore with lubricant, means acting on the plug in the opposite direction for constantly forcing the plug against the lubricant in the chamber, and means for turning the plug.

7. A valve comprising, a casing having a passageway therethrough and a tapered bore transverse of the passageway, a tapered plug rotatably positioned in the bore and arranged to move axially therein, a stop at each end of the bore to limit the axial travel of the plug, said stops being spaced apart to permit the plug to have an axial travel of at least one sixteenth of an inch from one stop to the other, the taper of the plug and the bore being such that the space between the tapered surface of the plug and the bore varies less than two one thousandths of an inch during a one sixteenth of an inch axial movement of the plug, means for introducing lubricant under pressure into the valve to act on the smaller end of the plug and move the plug axially in a direction to separate the plug from the bore and to fill the space between the plug and the bore with lubricant so that there is no leakage between the plug and the bore and the plug is thereby made effective to control the flow of fluid through the casing irrespective of the axial position of the plug in the bore, resilient means acting axially on the plug to move it in the opposite direction, and means for turning the plug.

8. A valve comprising, a casing having a fluid passageway therethrough and a bore transverse of the passageway, a plug rotatably positioned in the bore and arranged to move axially in the bore in both directions and to control the flow of fluid through the casing irrespective of its axial position in the bore, the peripheral surfaces of the plug and the bore being tapered so that as the plug moves axially in one direction its tapered surface approaches the bore and as it moves axially in the opposite direction its tapered surface increasingly separates from the bore, a stop at the smaller end of the bore for preventing the plug from fully seating in the bore, a stop at the larger end of the bore for preventing the plug from separating from the bore more than a predetermined distance, means for introducing lubricant under pressure into the valve to act on the smaller end of the plug to move the plug to the limit of its travel in separating from the bore and to fill the space between the plug and the bore with lubricant so that there is no leakage between the plug and the bore and the plug is thereby made effective to control the flow of fluid through the casing irrespective of the axial position of the plug in the bore, resilient means acting on the plug to move it to the limit of its travel in the opposite direction, and means for turning the plug.

SVEN JOHAN NORDSTROM.